United States Patent Office 3,481,916
Patented Dec. 2, 1969

3,481,916
METAL COMPLEXES OF ALDEHYDE-BACITRACIN ADDUCTS
Miloslav Vondráček, Eva Toscaniová, and Josef Hoffman, Prague, Czechoslovakia, assignors to SPOFA, Spojene podniky pro zdravotnickou vyrobu, Prague, Czechoslovakia
No Drawing. Filed Oct. 4, 1965, Ser. No. 492,895
Claims priority, application Czechoslovakia,
Oct. 6, 1964, 5,530/64
Int. Cl. C07g *11/00;* A61k *27/00*
U.S. Cl. 260—112.5                            6 Claims

ABSTRACT OF THE DISCLOSURE

A bacitracin complex of high biological activity and low water-solubility is made by adding to an aqueous solution of the bacitracin an aldehyde selected from the group of (a) aliphatic aldehydes having at least 6 carbon atoms, (b) a phenyl aldehyde, (c) a phenol aldehyde, (d) a heterocyclic ring aldehyde having oxygen in the ring and (e) an aldehyde according to (b) or (d) above that is substituted by a ring-attached nitro group, dissolving the additive in the presence of a soluble salt of a metal of zinc, manganese, cobalt, copper, tin or iron, adjusting the pH of the solution to between 6.0 and 9.5, permitting the metal salt of the aldehyde-bacitracin complex to precipitate and recovering the precipitate.

---

The invention relates to new biologically active compounds of bacitracin of low water solubility, and to the method of their preparation.

Bacitracin is a known polypeptide antibiotic, produced by the microorganisms Bacillus subtilis and Bacillus licheniformis, and industrially made in a fermentation process. Its highly water-soluble form shows a relatively low stability and loss of its biological activity (L. C. Craig et al., J. Biol. Chem., 199, 259, 1952). For that reason bacitracin used to be converted to various salts of low water solubility but having much greater stability. The most common thereof are the complex salts with metals which have a low solubility (U.S. Patents 3,025,216, 2,985,533 and 2,985,534), the best known being the complex salt with zinc (U.S. Patents 2,809,892, 2,834,711 and 2,803,584). Yet these salts are still water soluble to such degree that they cannot be prepared by precipitation from dilute solutions, such as the fermentation broths. In order to render the production of said salts economical, it is necessary to refine and concentrate the respective fermentation media.

The drawbacks and imperfections of the methods used until now are obviated, according to the method of the invention, by the preparation of new biologically active compounds of low water solubility of bacitracin. The essence of the method lies in the feature that water solutions of bacitracin are treated within a pH range of 6.0 to 9.5, preferably 7.0–8.0, with an aliphatic, aromatic or heterocyclic aldehyde, which as the case may be, substituted in the nucleus, in the presence of soluble salts of metals capable of forming a complex with bacitracin, such as zinc, manganese, nickel, cobalt, copper, tin, and iron.

At the stated conditions bacitracin is eliminated almost quantitatively even from exceedingly dilute solutions, in the form of a compound of bacitracin with the respective aldehyde, and forming a complex salt with the metal employed. The complexes have as a rule very low water solubility. Their antibiotic activity corresponds to the activity of the bound bacitracin. In the acidic pH zone the complexes are dissolved, by being split into their original components.

Said complexes can be utilized for an economical and technically inexpensive recovery of bacitracin from large volumes of dilute aqueous solutions. The complexes can serve, either as such for various technical purposes, e.g. as feed additives, or as the starting raw material for preparing any desired form of bacitracin.

As the aldehydes for carrying out the method according to the invention, aldehydes of the aliphatic series (from 6 carbon atoms up), aromatic or heterocyclic aldehydes may be used and they may be either unsubstituted or substituted in the nucleus, such as n-decylaldehyde, benzaldehyde, salicylaldehyde, m-nitrobenzaldehyde, furfural, or 5-nitrofurfural. If the complex bacitracin compound is processed further by decomposition in acid media, the released aldehyde can be regenerated.

EXAMPLES (1) A fermentation broth from the industrial cultivation of the productive microorganism Bacillus licheniformis, after being adjusted to a pH of 3.0 is separated from the biomass by centrifuging, and the pure liquid adjusted with NaOH solution to a pH of 5.5 The biologically determined activity of this liquid amounts to 180 u./ml.

To 5 liters of the liquid 15 g. of freshly redistilled furfural and 5 g. zinc sulfate were added. After dissolution of the ingredients the pH value of the mixture was adjusted to 7.6, and the solution was stirred for 45 min. The precipitate was then removed by suction and washed with a little water. After drying there were obtained 21 g. of a greyish powder, the activity of which, determined after dissolving it in a citric acid solution, amounted to 38.9 u./mg., which corresponded to a yield of 90.7% related to the starting broth. The biologically determined activity of the filtrate amounted to 9.6 u./ml., i.e., 5.3%. The zinc content in the complex was 6.2%.

(2) To 5 liters of a starting liquid as in Example 1 there were added at a pH of 5.5 with stirring 16 g. benzaldehyde and 5 g. zinc sulfate. After adjustment to a pH of 7.8 and stirring for 45 min., the insoluble complex thus formed was removed by suction, washed first with 250 ml. water and then with 100 ml. acetone, and vacuum dried. There were obtained 20.5 g. of a slightly yellowish powder, the activity of which, determined after dissolving it in 5% citric acid, amounted to 42 u./mg., which corresponded to a yield of 95.6% related to the starting broth. In the filtrate an activity of 4.5 g. u./ml., i.e., 2.5% was found. The zinc content was 4.9%.

(3) To 2.5 liters of the fermentation liquid according to Example 1, there were added at a pH of 5.5 100 ml. of a 2.5% zinc sulfate solution and 7 g. salicylaldehyde. The mixture was adjusted while stirring to a pH of 7.4 and after 30 min. stirring the insoluble complex which precipitate was removed by suction and washed with 150 ml. water and 150 ml. acetone. There were obtained 11.2 g. of a yellowish powder with a biological activity of 40 u./mg., which corresponded to a yield approximating 100%. In the filtrate no more biological activity was found. The zinc content in the complex was 4.1%.

Similar to the preceding examples, but using n-decylaldehyde, m-nitrobenzaldehyde, or 5-nitrofurfural, and a water soluble heavy metal salt, the corresponding bacitracin complexes can be prepared.

We claim:
1. A process for the preparation of a bacitracin complex of high biological activity and low water solubility comprising the steps of dissolving
   (a) an aldehyde selected from the group consisting of furfural, benzaldehyde, salicylaldehyde, n-decylaldehyde, nitrofurfural, and nitrobenzaldehyde, and
   (b) a soluble salt of zinc, manganese, cobalt, copper, tin or iron, in an aqueous solution of bacitracin, permitting said aldehyde and salt to enter into reaction with the bacitracin, then adjusting the pH of the solution to between 6.0 and 9.5 so as to precipitate the formed metal salt of the aldehyde-bamitracin complex, and recovering the precipitate.

2. The process of claim 1 wherein the pH of the solution is adjusted to between 7.0 and 8.0.

3. The process of claim 1 wherein the pH of the aqueous solution prior to the addition of the aldehyde is adjusted to about 5.5.

4. The process of claim 1 wherein as the aqueous solution the fermentation broth obtained in the cultivation of bacitracin is employed.

5. The process of claim 1 wherein the aldehyde is furfural, benzaldehyde or salicylaldehyde and the metal is a water soluble zinc salt.

6. The process of claim 1 wherein an aldehyde selected from the group consisting of furfural, benzaldehyde and salicylaldehyde and a soluble zinc salt are dissolved in the aqueous fermentation broth obtained in the cultivation of bacitracin after the broth has been adjusted to a pH of about 5.5 whereupon the pH of the solution is adjusted to between 7.0 and 8.0 followed by the precipitation and recovery and of complex.

References Cited

UNITED STATES PATENTS

| 2,834,711 | 5/1958 | Zinn et al. | 167—65 |
| 3,205,137 | 9/1965 | Lewis et al. | 167—65 |
| 3,228,836 | 1/1966 | Anschel et al. | 167—65 |
| 3,384,631 | 5/1968 | Kalina et al. | 260—112.5 |

OTHER REFERENCES

Hickey: Progress in Industrial Microbiology, 5, 96–102 and 121–136 (1964).

LEWIS GOTTS, Primary Examiner

MELVYN KASSENOFF, Assistant Examiner

U.S. Cl. X.R.

424—177